United States Patent [19]
Wils

[11] Patent Number: 4,728,087
[45] Date of Patent: Mar. 1, 1988

[54] ANCHORING ARRANGEMENT FOR HEAVY COIL SPRINGS, PRIMARILY IN COIL SPRING CARRIED PLAYGROUND DEVICES

[75] Inventor: Tom L. Wils, Fruens Böge, Denmark
[73] Assignee: Multikunst Design Aps, Denmark
[21] Appl. No.: 825,894
[22] Filed: Feb. 4, 1986

[30] Foreign Application Priority Data

Feb. 7, 1985 [DK] Denmark ............... 549/85

[51] Int. Cl.⁴ .......................... F16F 1/06; F16F 1/12; A63G 17/00
[52] U.S. Cl. .................... 267/178; 248/624; 267/179; 272/52; 297/307
[58] Field of Search ............ 267/60, 22 A, 48, 8, 267/134, 135, 69–74, 166–180, 131–133, 139–140, 33, 140.5, 61, 62, 4, 911, 63 A, 150; 272/52; 248/624; 297/307, 273; 105/197, 198, 197.05–198.7

[56] References Cited

U.S. PATENT DOCUMENTS

| 292,775 | 1/1884 | Vose | 267/4 |
|---|---|---|---|
| 1,716,431 | 6/1929 | Delgado | 267/179 X |
| 2,892,482 | 6/1959 | Beoletto | 248/624 X |
| 2,996,298 | 8/1961 | Grosse et al. | 272/52 |
| 3,078,479 | 2/1963 | Grosse et al. | 272/52 X |
| 3,141,660 | 7/1964 | Clarke et al. | 267/60 |
| 3,276,764 | 10/1966 | Bitterberg | 267/4 |
| 3,591,161 | 7/1971 | Scheublein, Jr. et al. | 267/61 S |
| 3,674,250 | 7/1972 | Joseph | 267/61 S |
| 3,772,995 | 11/1973 | Wright | 267/4 X |
| 3,862,751 | 1/1975 | Schwaller | 267/168 X |
| 4,032,125 | 6/1977 | Minakawa et al. | 267/63 A |
| 4,093,198 | 6/1978 | Petersen | 267/179 |
| 4,379,550 | 4/1983 | Petersen | 272/52 |
| 4,575,072 | 3/1986 | Russell | 272/52 |
| 4,614,333 | 9/1986 | Gaylord | 267/61 S |

FOREIGN PATENT DOCUMENTS 1199061 8/1965 Fed. Rep. of Germany .... 267/61 S

Primary Examiner—Douglas C. Butler
Attorney, Agent, or Firm—Antonelli, Terry & Wands

[57] ABSTRACT

Adjacent the rigidly anchored end of a vertical coil spring, which carries out transverse oscillations, the spring is subjected to considerable breaking forces which limit the lifetime of the spring. At least one abutment is provided to cooperate with a spring portion slightly spaced from the rigidly anchored spring end such that this spring portion is permitted to carry out only a limited vertical movement, whereby the breaking influence on the spring is largely reduced.

4 Claims, 2 Drawing Figures

ANCHORING ARRANGEMENT FOR HEAVY COIL SPRINGS, PRIMARILY IN COIL SPRING CARRIED PLAYGROUND DEVICES

BACKGROUND OF THE INVENTION

The present invention relates to an anchoring arrangement for a coil spring, which, in use, is to carry out transverse oscillations from a rigidly anchored end thereof, primarily for use with coil spring supported playground devices. In that connection the coil spring will be a rather heavy spring constituting the sole carrier connection between a seat and a ground support and a playing child may thus carry out resilient side rocking movements on the device.

Hereby the lower end of the spring will have to be rigidly anchored, and as expectable the spring will stand but a limited number of rocking movements, inasfar as at some time or other it will break near its rigid anchoring, where the spring is subjected to real breaking forces. With the choice of a good spring material and a suitable design of the fixed anchor means an acceptable lifetime of the spring is achievable, but yet no more than it would still be desirable to further prolong the lifetime of the spring.

The purpose of the invention is to provide an anchoring arrangement which will essentially increase the durability of the spring or ensure an unchanged durability with the use of a spring material of reduced quality and therewith of reduced price.

According to the invention the anchoring arrangement comprises fixed abutment means located adjacent a spring portion near the fixed spring end so as to effectively limit the movability of said spring portion in the axial direction of the coil spring in such a manner that this spring portion is allowed to carry out an axial movement of between 10% and 90%, preferably some 50%, of the movement length as would be incurred, without the said limitation, by an operative normal maximum bending out of the spring.

When the spring, in normal use, is reciprocally bent to and fro the spring winding portions at one side of the coil spring will approach each other equally while at the opposite side of the spring they will become increasingly mutually spaced, whereafter the situation will be inversed during the return movement of the spring. With the arrangement according to the invention, of course, the bendability of the spring will be slightly limited, when a portion of the spring cannot move entirely freely, but such a limitation is without any practical significance when it occurs only near the fixed end of the spring.

With the use of the arrangement according to the invention the spring will operate fully normally as long as its amplitude of bending oscillation is small, e.g. up to about the half of the amplitude of the normal operational maximum bending of the spring, and the said associated break influence on the spring will thus still occur just outside the fixed anchoring of the lower spring end. This weak influence, however, does not weaken the spring material in any significant manner.

What is much more important in this respect is the large amplitude oscillations of the spring and the associated heavy influence on the spring portion adjacent the fixed end of the spring. In such situations, according to the invention, the spring portion near the fixed end portion, both when moving up and down, will be stopped by hitting the said fixed abutment means, and the breaking action on the spring immediately adjacent the fixed anchoring, therefore, will not be increased, inasfar as the potential breaking effect or the surplus thereof will be transferred to the spring portion adjacent the said abutment means.

Adjacent the abutment means, however, the spring is not anchored in any fixed manner, but only supported against further axial movement, and at this place, therefore, there will be no concentrated breaking action on the spring, but the associated stress will rather be distributed over a relatively long spring portion at one and the other side of the abutment means, respectively.

This distribution or smoothening out of the breaking stress for large oscillation amplitudes accounts for the spring not constantly being break loaded just adjacent the fixed anchoring, and in practice the associated relief of this critical area has the effect that the lifetime of the spring is increased quite considerably.

In the following the invention is described in more detail with reference to the accompanying drawing.

BRIEF DESCRIPTION OF THE DRAWINGS

FIG. 1 is a perspective view of a playground device having an anchoring arrangement according to the invention, while

DETAILED DESCRIPTION

Figure 1:
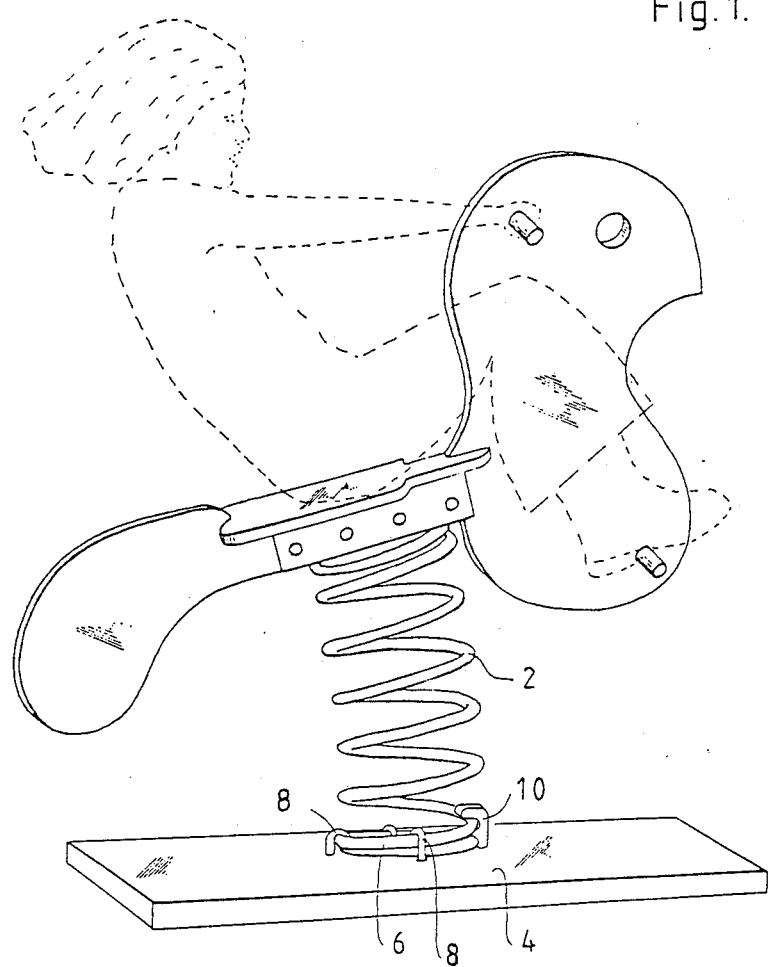

The device shown in FIG. 1 is of a well known type having a heavy coil spring 2, the top end of which is provided with a seat, while its lower end is rigidly secured to a ground anchor element 4, which may be a heavy concrete tile or the top end of a buried anchor structure. A playing child may carry out rocking movements as illustrated, whereby the coil spring reciprocably bends, and whereby the discussed problems wih respect to spring breakage adjacent the ground anchoring element 4 will occur after some years of use, in the prior art after only rather few years of use.

In the example shown the coil spring 2 has a lower horizontal end winding 6, which is rigidly clamped to the anchor 4 by ordinary clamps 8 and a special, upwardly extended clamp 10. From the end winding 6, as from the cross sectional area designated B is FIG. 2, the coiled spring rod projects upwardly with increasing pitch until it continues in a constant pitch portion along the major part of the length of the coil spring 2. Thus, with reference to the marked cross sections A-D of FIG. 2, the winding A-B is fixed to the anchor element 4 with the half-winding B-C leaving the fixed winding at B, and the distance A-C will be smaller than the distance B-D.

The clamp 10, as holding the spring rod portion or section A, has a top side portion 12 located slightly underneath the spring rod portion or section C and is prolonged upwardly in a portion 14 having an upper leg 16 projecting inwardly over the spring rod at C such that the lower side 18 of the upper leg 16 is located above the spring rod slightly spaced therefrom. Thus, the coil spring 2 may carry out low amplitude oscillations in a fully usual manner, without the rod portion C even touching the surfaces 12 and 18.

Figure 2:
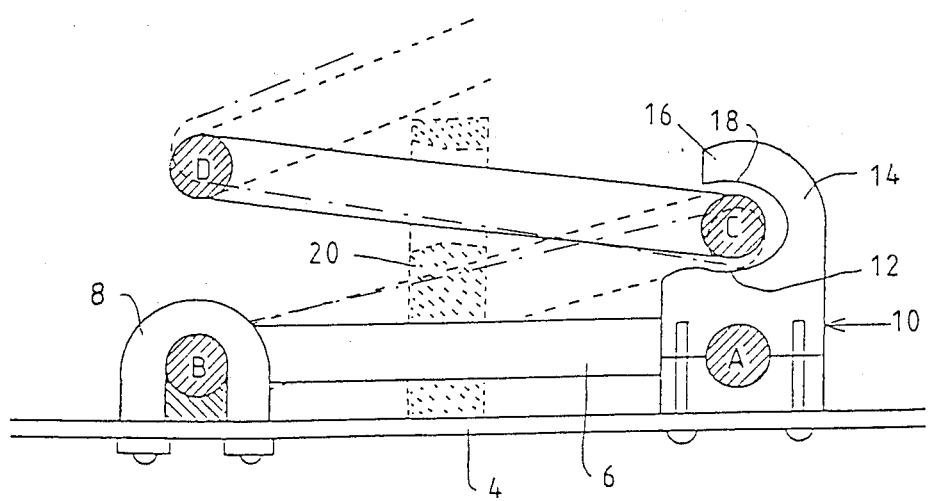
FIG. 2 is an enlarged lateral view of the anchoring arrangement.

For a given type of the playground device it is easy to determine a "normal operational maximum amplitude" of the oscillation of the upper end of the coil spring 2 and to correspondingly determine the normal maximum displacement of the spring rod portion C, upwardly when the top end of the coil spring 2 is moved to the left and downwardly when the coil spring 2 is rocked to the right, the latter situation being illustrated in dotted lines in FIG. 2. Based on the knowledge of this mainly vertical maximum displacement of the rod portion C the clamp 10 is designed such that the rod portion C will abut the respective surfaces 12 and 18 when the rod portion C has been displaced approximately half of the vertical maximum displacement.

By the associated stoppage of the half-winding B-C from being bent out from B more than corresponding to half the operational vertical maximum displacement the long term weakening of the rod material adjacent the potential breaking area at B will be essentially reduced, more than halved because the weakening would otherwise increase exponentially with the oscillation amplitude.

For high oscillation amplitudes, whereby the rod portion C will abut the respective support surfaces 12 and 18, a break action will of course occur at C, but since the rod portion C is not directionally fixed the break action will not occur in any concentrated manner at C, but will be distributed along the spring rod to both sides of the area or rod portion C, i.e. along the entire length D-C-B. The associated material weakening in each or any of the cross sectional areas of the spring rod along this length, therefore, will be very small, and the result will be a very remarkable prolongation of the lifetime of the coil spring 2.

More than one clamp 10 may be arranged along the lower end of the spring rod, such that the vertical displacement of the spring rod is limited gradually more and more towards the fixed end thereof, whereby the potential breaking forces are distributed over a still further increased length of the spring rod.

Such an additional clamp or abutment member, designated 20, is shown in dotted lines in FIG. 2. It is placed staggered some 90° from the clamp 10, whereby it is particularly active when the coil spring 2 is operated to oscillate solely or additionally perpendicularly to the main direction of the oscillation.

The abutment members 10 and 20, of course, should not necessarily be combined with clamp means for the anchoring of the lower winding A-B.

It has been mentioned that the abutment member 10 should limit the local spring rod movement to about the half of its normal maximum, but the invention is not correspondingly restricted. Even with a limitation of only 10% it is still obtained that the strongest of the breaking actions adjacent the area B will be avoided, and since the weakening of the material is increased exponentially with the breaking influence even such a restricted limitation of the extreme movements will have a significant effect as to the durability of the spring. On the other hand, also a limitation of 90%, whereby the spring rod portion C is allowed to move only some 10% of its potential free maximum movement, will be of importance because the concentrated break actions of the area B will be drastically reduced, while the correspondingly increased bending action on the spring rod length B-C-D will be distributed along this length such that the associated weakening is not concentrated at any specific area, although of course the area C will become increasingly critical in this respect the more its vertical movability is restricted.

It should be mentioned that it is already known to make use of a clamp or abutment member rather similar to the member 10, though designed such that the spring portion C is entirely prevented from moving vertically, see e.g. the U.S. Pat. No. 4,093,198. The purpose of that arrangement is to avoid the risk of the user or others to have fingers or toes jammed between the lower spring windings as located relatively close to each other due to the small pitch thereof. It will be appreciated that the same anti-jamming effect is obtained or maintained by the present invention, because the vertical movability of the spring rod portion C is quite small, just as the free spaces between this rod portion and the abutment surfaces 12 and 18 are so narrow that they will not themselves give rise to any jamming risks.

The invention is not limited to coil springs of the type having flattened end portions. It is well known in the art to make use of regular constant pitch coil springs and to anchor the ends thereof by suitable anchoring means, whereby the breakage problems are the same as here discussed.

The dimensions of a spring as shown in FIG. 1 may be exemplified as follows:

A steel spring of 18 mm steel rod and with 7.5 windings has a height of 360 mm and an external diameter of 190 mm. The top of the spring is expected to pivot through some 200 mm, corresponding to a bending out of about 15° to each side, i.e. a total of about 30° as a normal operational maximum. This movement will result in a movement of about 6 mm of the spring winding portions at the relevant opposed sides of the spring, and the movability of the area or portion C (FIG. 2), therefore, is preferred to be limited to about 3 mm, i.e. ± about 1.5 mm.

The normal operational maximum of the pivoting of the spring will have to be determined empirically or by suitable standards, based on the knowledge of the probable "normal" maximum in view of the expected circumstances of the use of the device. It may well happen that the "normal" maximum is ocassionally exceeded, without this having to be of any significant influence on the lifetime of the spring.

What is claimed is:

1. A playground device comprising a generally vertically oriented coil spring, a ground supported base means for rigidly fixedly anchoring a lower end of said coil spring to a ground supported base member, a user support structure provided at a top end of the coil spring, said coil spring being adapted to carry out resilient transverse oscillations from the lower rigidly fixedly anchored end thereof in response to the user support structure being caused to rock to and fro, whereby the coil spring is bent in opposite directions between opposite bent-out positions with an operative maximum amplitude defined by a maximum degree of bending during use of the playground device, rigid abutment means are disposed adjacent the lowered rigidly fixedly anchored end of the coil spring, said rigid abutment means being associated with said base member and being adapted to cooperate with a portion of the coil spring carrying out a vertical displacement by the oscillating bending of the coil spring so as to permit the portion of the coil spring to freely carry out vertical movements to respective sides of a rest position thereof and for effectively preventing the vertical movements of the portion of the coil spring from exceeding 10-90% of a free vertical displacement of said coil spring portion by said maximum degree of bending of the coil spring during use of the playground device.

2. A playground device according to claim 1, characterized in that means are provided for enabling the rigid abutment means to be adjusted so as to permit a free axial displacement of said spring portion of approximately 50% of a maximum amplitude of the coil spring.

3. A playground device according to claim 1, characterized in that at least two abutment means are arranged adjacent a first free winding of the coil spring outside the fixedly anchored end thereof, said rigid abutment means being spaced at a distance of preferably some 90° from each other in a circumferential direction of the coil spring.

4. A playground device according to claim 1, characterized in that at least two rigid abutment means are arranged adjacent a first free winding of the coil spring outside the fixedly anchored end thereof, and wherein, in a no-load condition of the spring, the winding sections cooperating with the respective opposed portions of said rigid abutment means are located substantially midways between said portions of said rigid abutment means such that the rigid abutment means are operative by axial movements in directions corresponding to a compression and pulling movement which occurs during a side rocking of the coil spring.

* * * * *